Feb. 28, 1933. H. V. PUTMAN 1,899,719
SYNCHRONOUS MOTOR HAVING HIGH STARTING AND PULL-IN TORQUES
Filed Aug. 14, 1929
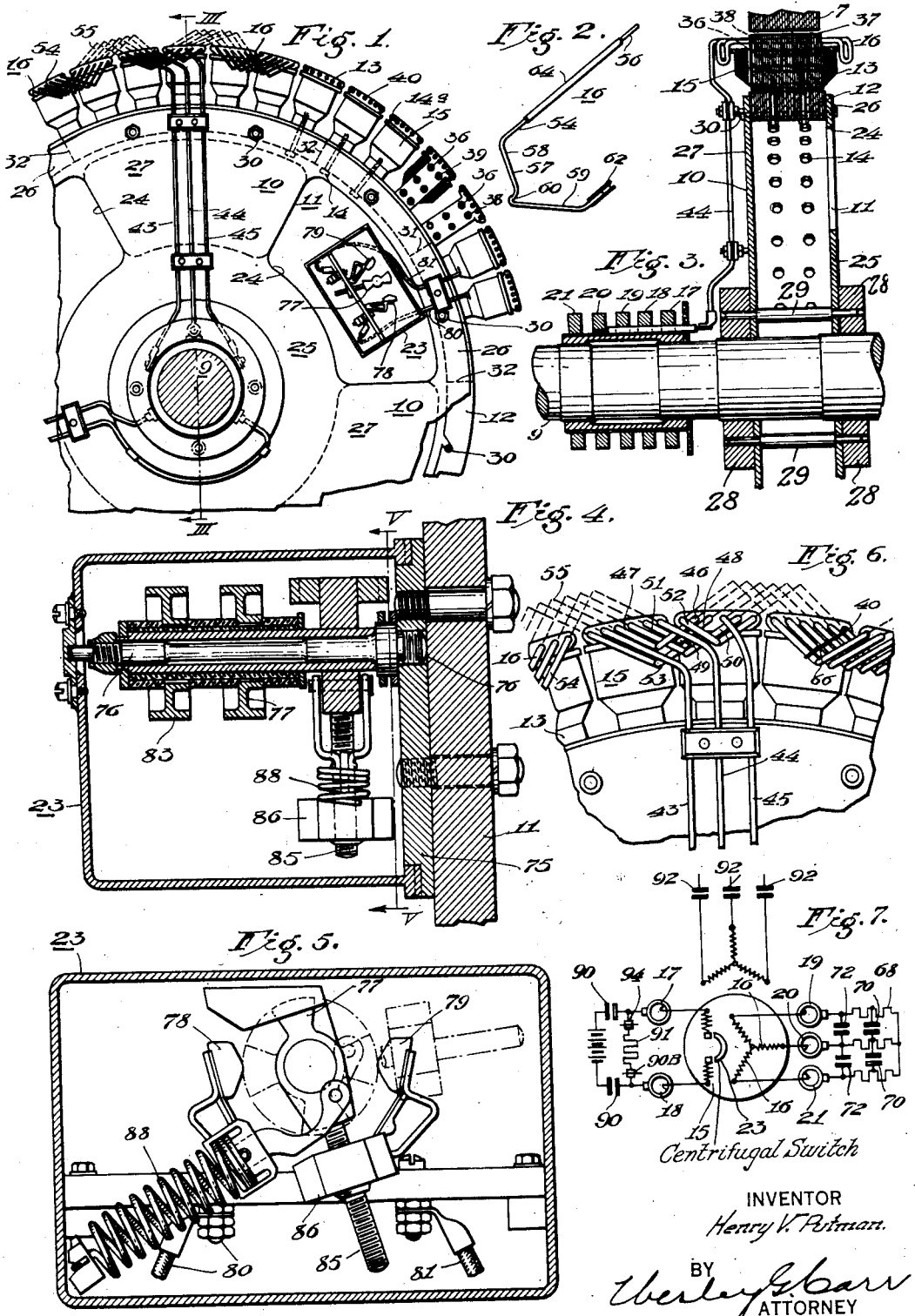
INVENTOR
Henry V. Putman.
BY
ATTORNEY Patented Feb. 28, 1933

1,899,719

UNITED STATES PATENT OFFICE

HENRY V. PUTMAN, OF EDGEWOOD, PENNSYLVANIA, ASSIGNOR TO WESTINGHOUSE ELECTRIC & MANUFACTURING COMPANY, A CORPORATION OF PENNSYLVANIA

SYNCHRONOUS MOTOR HAVING HIGH STARTING AND PULL-IN TORQUES

Application filed August 14, 1929. Serial No. 385,902.

My invention relates to a new form of synchronous motor, which I have called a "simplex" motor, having a starting performance approximately equivalent to slip-ring induction-motor characteristics, while maintaining the excellent running performance of the salient-pole synchronous motor.

The difficulty and previous impossibility of obtaining synchronous motors having the characteristics just mentioned has led manufacturers to resort to such expedients as the synchronous induction motor, with its high cost, low efficiency, low pull-out torque and low-voltage, high-current excitation; the "clutch" motor, in which an ordinary synchronous motor is started running freely and, after synchronous operation has been reached, the load is picked up by means of a clutch; and the "super-synchronous" motor, in which the load is always connected to the rotor shaft, but the stator member is mounted to rotate freely during the starting period and, after synchronism has been reached, the stator member is gradually brought to standstill by means of a brake, thereby accelerating the load. A desire to attain the result accomplished by my invention has also led designers to employ a "double-deck" squirrel-cage winding, only to find that its beneficial effect is very limited because there is not sufficient room in the pole face or pole head of a salient-pole motor to accommodate the deep slots which are necessary to obtain the effect of a low-reactance, high-resistance winding on which to start, and a high-reactance, low-resistance winding for bringing the motor up to a sufficiently high speed to permit pull-in to synchronism.

To achieve the object of my invention, I have introduced a number of novel features of design and novel combinations of design features, together with novel methods of operating such motors; including a phase-wound damper winding, in place of the standard squirrel-cage winding in the pole faces or pole heads of the motor; a centrifugal sectionalizing or cut-out switch for the direct-current field winding of the motor; a laminated and insulated construction of the rim and the pole pieces of the field member, so as to substantially eliminate all eddy currents from the flux-carrying parts of the motor during the starting period; and a novel mechanical construction for such motor, whereby access is readily had to all necessary parts thereof.

Referring to the accompanying drawing,

Figure 1 is an end elevational view of a rotor member embodying my invention,

Fig. 2 is a perspective view of one of the winding elements from which my combined damping and starting winding is constructed, Fig. 3 is a fragmentary longitudinal sectional view of a motor embodying my invention, the section plane being indicated by the line III—III in Fig. 1, Fig. 4 is a longitudinal sectional view through a centrifugal switch utilized in my motor, Fig. 5 is a transverse sectional view of the same, the section plane being indicated at V—V in Fig. 4, Fig. 6 is an enlarged detail view of the top portion of Fig. 1, and Fig. 7 is a wiring diagram of my motor.

My improved motor has a laminated-core primary member, here illustrated as being the stator member, of any conventional design, the same being indicated by the numeral 7 in Fig. 3.

The secondary member of my motor, which is, in the preferred construction, also the rotor member, has many novel features, as has already been indicated. It comprises a shaft 9; a pair of spider end plates 10 and 11; a rim or yoke member 12 supported by the spider end plates; a plurality of salient pole pieces 13 secured to the outer periphery of the rim member 12 by means of bolts 14 extending through holes drilled in the rim member; said pole pieces having pole faces or heads 14a which retain the direct-current field winding 15 in place on the respective pole pieces and which also carry my improved phase-wound damper winding 16; and a plurality of slip rings carried by the shaft, two of the slip rings 17 and 18 being for the direct-current-field-winding terminals, and three of the slip rings 19, 20 and 21 being for the damper-winding terminals. The spider end plate 11 also carries a centrifugal switch 23. Nearly all of these parts are special.

Each of the spider end plates 10 and 11 is cut from a sheet-steel plate, one inch thick, and is provided with three large perforations or holes 24 which divide each end plate into a hub portion 25, a rim portion 26 and three spider arms 27. The holes 24 of one of the end plates are opposite the spider arms 27 of the other end plate, so as to provide easy access to the heads of the pole-retaining bolts 14, on the inner periphery of the rim member 12. Thus, in a 300-H. P. motor, the holes 24 have a radial depth of some two feet and a circumferential width of somewhat more than this, so that it is plainly seen that a workman can easily reach any one of the pole-retaining bolts 14, at the one or the other end of the motor, in case of necessity.

A separate hub member 28 is disposed against the outside of each of the end plates 10 and 11, and a plurality of shouldered pins 29 are disposed between said end plates in the vicinity of said hub members for holding the same in spaced relation, said pins 29 preferably having extensions entering into the two hub members for securing them in position with respect to said end plates.

The rim member 12 is of very unusual construction and is mounted on the plurality of cross ties or bolts 30 which join the rim portions 26 of the two spider end plates 10 and 11. The rim member 12 is composed of segmental laminations, the inner peripheries of which are suitably notched to be retained by the cross rods or bolts 30 which extend between the peripheral members of the two end plates. These segments are staggered, and the division line between them is indicated in Fig. 1 by the numerals 31 and 32.

The method of mounting the segmental laminations of the rim member 12 may be any method commonly used for the core members of alternating-current machines carrying alternating fluxes, in which the supporting rods or bolts 30 are placed near the periphery of the rim member which is farthest away from the air gap of the machine, so that said rods or bolts are out of the path of the pulsating fluxes travelling circumferentially through said laminations. The laminations are also preferably insulated from each other by a suitable insulating finish, such as the baked sodium silicate finish described in the application of Joseph E. Gross, Serial No. 234,563, filed November 19, 1927, for Insulating materials, assigned to Westinghouse Electric & Manufacturing Company.

The novel feature about my laminated rim member 12 is that it is the yoke member of a salient-pole, direct-current field member of a synchronous machine, and yet, it is laminated. as in any induction motor.

Heretofore, it has been known that eddy currents exist in the solid iron portions of synchronous-motor field members during the starting periods thereof, and these eddy currents have even been relied upon, to some extent, for producing some starting torque. In salient-pole synchronous motors previously designed to have somewhat better than usual starting torques, it has been felt that such eddy currents as exist would be small compared to the currents in the special damper or starting windings which were provided, and that the effect of such eddy currents would be beneficial, merely adding slightly to the starting winding torque, so that it has not heretofore been deemed necessary or expedient to laminate the rim member or yoke which supports the salient poles of a synchronous motor.

I have found, however, that, while the amount of energy absorbed by the eddy currents in an unlaminated construction was really a small portion of the total secondary energy of the motor during the starting period, still this eddy-current energy has a very poor power factor and the eddy currents themselves are very large, so that the inrush current, or initial starting current of the motor, for a given amount of torque, was very materially increased by reason of the very poor power factor of the eddy currents. There was no way of finding this out except by building a motor embodying my laminated construction, after which, by comparison, I learned what a high price synchronous-motor designers had been paying for their blind acceptance of conventional designs in using unlaminated field constructions for their salient-pole synchronous motors.

When I speak of laminated constructions, I am referring to constructions which are so designed as to substantially eliminate all eddy currents from the flux-carrying parts during the starting operation. This means that there shall not be a complete electrical path embracing the circumferentially flowing alternating fluxes in the rim or yoke during the starting period. In the appended claims, I use the term "insulated and laminated" to express this idea.

My insulated and laminated rim member 12, as applied to a slow moving, large pole-number, salient-pole motor-construction, having speeds, such as 164 R. P. M., is to be distinguished from high-speed rotor constructions in which the rotating field member has been laminated for structual reasons only, in order to secure sufficient mechanical tensile strength to withstand the very large centrifugal forces, the laminations consisting of rather thick pieces of steel which were staggered and thoroughly bolted or riveted together, with many bolts or rivets, resulting in many low-resistance closed circuits encircling the circumferential pulsating fluxes during the starting period.

My pole pieces 13 are also laminated and insulated. That is, the rivets 36 which bind the pole-piece laminations 37 together are insulated by means of insulating sleeves 38 and insulating washers 39, so that there is provided no closed path which encircles the alternating flux flowing up and down through the pole pieces during the starting period. Here again, it is necessary to distinguish from prior constructions, where pole pieces have been built up of punchings securely riveted together, in order to avoid the expense of machining the pole pieces out of large pieces of steel; but, in these prior constructions, the laminations have been tightly bound together with many rivets, without insulation, so that very large eddy currents were circulated in the closed paths thus formed.

My damper winding 16 has several novel features of construction. In the first place, it is placed in a single row of peripheral slots 40 placed in the pole faces or heads 14a near the air gap of the machine, so that the reactance of my damper winding is reduced as far as possible, thereby assuring a high power factor and, hence, a low value, of the starting currents.

My damper winding 16 occupies no more space, in the pole faces or heads 14a, than any ordinary damper winding, so that it is not necessary to use deeper pole heads and, hence, a larger machine, than is ordinarily required. This result is brought about by using a phase-wound winding, having a single conductor per slot, which is a unique winding. By using a single conductor per slot, I avoid the necessity for insulating the two or more conductors lying in the same slot, as in previous phase windings in induction motors, thereby improving my space factor and making it possible to use only light insulation between the conductors and the slot walls, with the result that the conductors of my damper winding 16 are in rather good thermal relation to the pole pieces, as compared with ordinary phase-wound induction-motor secondary windings. In fact, a good thermal relation between the iron parts and the secondary windings would not be of any particular benefit in an induction motor, because the iron runs almost as hot as the conductors. In synchronous motors, however, where the starting winding is only called upon for very intermittent service, the starting windings may be very much more heavily loaded than is possible in induction-motor practice, so that the temperature of the starting windings during the brief starting period becomes very much higher than that of the iron, and the good thermal relation between the starting windings and the iron is of very material benefit in increasing the capacity of the starting windings since it allows the heat to flow from the winding into the iron.

My unique design of a phase-wound winding in a single-conductor-per-slot construction may be worked out with either five or six or other number of slots per pole. Thus, all of the slots in all of the winding conductors in slot 1 of all of the poles may be joined together in series, and these conductors may then be joined in series with some or all of the conductors in another slot of some or all of the poles, and so on, for each phase, until an approximately symmetrical three-phase or other polyphase winding is produced, the terminals of which are carried out to the slip rings 19 to 21.

In the preferred construction of my phase-wound winding, as shown in Fig. 1, six slots are provided in each pole face, and three terminal conductors 43, 44 and 45 are provided, which go to the slip rings 19, 20 and 21. Terminal 43 is connected to a phase which embraces, first, all of the windings in slot 2 of each pole, progressing around the periphery, in the positive or counter-clockwise direction, to the point 46 in the top pole piece of Fig. 6; then, by means of a special end connector 47, connection is made to the beginning of the windings in slot 3, which are then connected, in the same counter-clockwise direction, until all of the slots 3 of all of the pole pieces have been traversed, when another special end connector 48 makes engagement with a star connection 49 near the top pole piece of Fig. 6. The phase corresponding to the third terminal conductor 45 in like manner embraces all of the conductors in slots 4 and 5, using the special end connector 50 to join the conductors in slots 4 and 5, and, progressing around the circumference in the negative or clockwise direction, until contact is made with the star point 49 by means of a special end connector 51. The other terminal conductor 44 is connected, first, to the conductors in slot 6 in the positive or anti-clockwise direction, and then by means of a special jumper 52, to the conductors in slot 1 in the negative or clockwise direction, terminating in a special connection 53 which is brazed to the star point 49.

The damper winding 16 is preferably constructed of J-shaped elements 54 and 55, except for the six special front end connectors 47, 48, and 50 to 53 already mentioned. Each J-shaped element 54, as shown in Fig. 2, comprises a straight inductor bar 56 adapted to be threaded into one of the slots in the pole face, and having its front end bent to the right to form the front-end connection 57 joining the conductor in this slot to the conductor in the corresponding slot in the next pole piece to the right. The front end-connection 57 comprises two inclined portions 58 and 59, joined by a longitudinal offset section 60 in substantially the center thereof, so that the end connections of adjacent coils will lie in nested position, as shown in Figs. 1 and 6. The J-shaped element 54, just described, constitutes one half of a coil, the other half being completed by means of a reversely shaped, J-shaped element 55 which is indicated diagrammatically by means of dotted lines in Figs. 1 and 6, and which is like the J-shaped element 54 except that the straight conductor portion is bent to the right, at its rear end, to provide rear end-connections which are nested, as is shown in Fig. 1 for the front end connections, thus providing a progressive winding extending around the circumference. The abutting ends of the J-shaped elements 54 and 55 are joined by any suitable connector 62, as shown in Fig. 2.

One advantage of the phase-wound damper winding 16, just described, is that it is formed of heavy self-supporting, round, bare, copper bars, $\frac{5}{16}''$ or larger, in diameter, which are provided with insulation only over the portions which lie within the slots, as indicated at 64 in Fig. 2, the insulation being thin, as already mentioned. The end connections are thus composed of bare copper bars which are spaced from each other and which are self-supporting at the rated speed, which is of the order of 164 R. P. M. As a matter of convenience, I sometimes lace some stout twine 66 between the end connections, as indicated in Fig. 6, to prevent possibility of endwise movement of any of the bars.

It will be noted that, in my preferred construction shown in Fig. 1, the pole faces or heads of adjacent pole pieces almost come into contact, so as to form a rotor member having an almost continuous peripheral face, with substantially equally spaced slots.

The phase-wound damper winding 16 is connected, through its slip rings 19, 20 and 21, to an external resistor-bank 68 which is provided with short-circuiting switches 70 and 72, as indicated in Fig. 7, for the purpose of varying the resistance during the starting period.

The design of the brush gear for the slip rings 19, 20 and 21, and the design of the resistor switches 70 and 72 are both special, as they are designed to carry a high current, at a low voltage, as compared to the conventional induction-motor starting-winding design. It has become common practice, in the design of phase-wound induction-motor windings, for starting by means of external resistors, and in the design of the air-break contactors therefor, to adopt a secondary voltage as high as is permissible within one of the standard classifications of insulation, the lowest of these classifications being 600 volts. If the conventional phase-wound induction-motor design-principles were applied to the problem of designing a phase-wound damper winding for a salient-pole synchronous machine, the result would be to so design the winding as to have a maximum terminal voltage of at least 600 volts, in order to reduce the terminal currents to the smallest values possible within the limits of the insulation on the motor and on the switching equipment. In a 44-pole, 300-H. P. synchronous motor, operating at 164 R. P. M. on 60 cycles, the 600-volt secondary design would entail the use of a plurality of conductors or inductor bars per slot, in order to obtain even as much as 600 volts, thereby missing the advantages of light insulation, high space factor, good thermal relation with the pole head, and self-supporting mechanical construction of the damper winding, which have been pointed out as advantages accruing from my single conductor per slot. The 300-H. P. motor illustrated in the drawing uses a voltage of only 230 volts between slip rings at the beginning of the starting period, while obtaining a 200% starting torque, or twice the rated synchronous-speed torque.

The slip-ring brushes depart from the usual practice relative to phase-wound induction-motor secondaries in that they carry current only a very short time and hence, like the damper windings, may be very heavily overloaded, as compared with their continuous-load capacity.

The direct-current field winding 15 is preferably provided with a centrifugal switch, indicated in its entirety by the numeral 23, for closing the field-winding circuit after the motor has reached a sufficiently high percentage of its synchronous speed.

I have found that all attempts to utilize the field windings 15 to produce starting torque during the initial period of the starting operation, and all attempts to close-circuit the field windings by means of resistors for the purpose of preventing the occurrence of dangerous voltages therein during said period, have been the cause of a very material increase in the in-rush starting current, on account of the poor power factor of the currents in the field winding. I consider it an important feature of my invention, therefore, that I have provided a centrifugal switch by means of which the field circuit is open during the initial portion of the starting period, and is then automatically closed after the motor has reached a predetermined proportion of its synchronous speed.

If the field winding is wound for excitation on commercial direct-current voltages of 125 or 250 volts, or, in general, any voltage over 60 volts, the induced voltage resulting from transformer action between the primary winding and the field winding is so high that the centrifugal switch 23 should be utilized for sectionalizing the field winding into two or more sections or paths open at each end, as in my preferred construction. By providing the centrifugal switch with any desired number of pairs of contacts, the number of points at which the field winding is opened may be increased at will.

I have occasionally used field-excitation voltages of 45 to 55 volts, however, in which case it is not necessary to sectionalize the field winding in order to prevent the occurrence of induced voltages which are higher than can be safely applied to the insulation, but, even in this case, my centrifugal switch 23 may be desirable for the purpose of closing the circuit of the field winding at the desired percentage of the full synchronous speed.

As shown more in detail in Figs. 4 and 5, the centrifugal switch 23 has a base member 75 which is mounted on the spider end plate 11, as indicated in Figs. 1 and 4. The base plate supports a shaft 76 on which is insulatingly mounted a rotating contactor 77 to make and break contact between two stationary spring-pressed fingers 78 and 79 which are connected to terminals 80 and 81 leading to the mid-point of the field winding 15. Figure 4 shows the switch as being provided with a second segmental rotating contactor 83 that is not utilized on the particular motor which is illustrated in Figs. 1 and 2, but is provided as a part of a standard equipment, to take care of instances in which it is desirable to sectionalize the field winding into more parts.

The shaft 76 of the centrifugal switch is provided with a weight-arm 85 which carries a weight 86, at a suitably adjusted point for the purpose of developing a centrifugal force tending to close the switch contacts 78 and 79 by means of the rotating contactor 77. The centrifugal action is restrained by means of a spring 88 which is so applied that the moment arm of the spring is the greatest when the motor starts, so that the centrifugal action does not overcome the spring, to start the switch closing, until a very high speed, preferably around 90% of the synchronous speed, or, in general, between 50 and 98% speed is reached. On the other hand, when the switch is once closed and the motor is operating synchronously, the small-moment arm of the spring 88 and the relatively large-moment arm of the weight 86 under these conditions, as indicated in dotted lines in Fig. 5, both combine to keep the switch closed, upon shutting down the motor, until the speed has fallen to a very low value, preferably about 35% speed, or, in general, between zero and 40% speed.

I prefer to have my centrifugal switch remain open during the starting operation until about 90% speed has been obtained, in order to avoid the high voltages induced in the field winding initially and the damaging effect of the field-winding currents on the power factor, and hence, on the in-rush current of the motor during the initial starting period. I prefer to have the centrifugal switch contacts remain closed until a fairly low speed has been reached, upon deceleration of the motor, so as to allow ample time for the main-line breaker and the external-field switch to be opened, in case the synchronous motor pulls out of step by overloading, before the field-winding circuit is broken by the centrifugal switch. By these means, the opening of the field circuits and the discharge of the stored energy therein are performed by means of the external-field switch which is provided with discharge contacts and a discharge resistor for this purpose, instead of by the centrifugal switch.

The application of any kind of centrifugal switch to the field-winding circuit of synchronous motors is believed to be new, as well as the special feature just described, whereby the centrifugal switch is designed to have a wide difference in the speeds at which it operates on acceleration and deceleration, as distinguished from the ordinary centrifugal switches, in general, wherein the actions on acceleration and deceleration are made as nearly at the same speed as possible. It will be noted further, that my switch is so designed, that, once its movement has been started, either to open or to close the circuit, the changing moment arms will assure that the switch completes its movement with the desired snap-action, which avoids burning of the contacts.

Referring to Fig. 7, the method of operation of my motor is as follows: When the motor is not in use, the field switch 90 is open and the secondary contactors 70 and 72 are open, leaving the full value of the external resistance 68 connected across the damper winding. The field switch 90 has a pair of normally closed back-contacts 90B which close just before the main switch contacts 90 become fully opened, so as to connect a field-discharge resistor 91 across the terminals of the field winding. The centrifugal switch 23 is also open.

To start the motor, the primary line switch 92 is closed to apply full line potential to the motor. With an in-rush current of only slightly over 300%, that is, three times the current at rated full load, a starting torque of approximately 200% is obtained, as compared with about 60% starting torque which is usually obtained from an ordinary synchronous motor having about the same in-rush current.

As the motor accelerates, the secondary resistance 68 is cut out, in as many steps as may be desirable, until all of the secondary resistance is cut out, which will cause the motor to accelerate to approximately 90% speed. When the motor reaches 90% speed, the centrifugal switch 23 closes, thereby close-circuiting the field winding 15 through the field-discharge resistor 91 which assists in pulling the motor into synchronism by causing it to accelerate still closer towards synchronism, say to within about 4 to 6% of full synchronous speed. The field switch 90 is then closed, applying direct-current excitation to the field winding 15, and causing the motor to pull into step with a pull-in torque of about 125 to 135%, as compared with a pull-in torque of only about 40% with an ordinary salient-pole synchronous motor having an inrush of about the same value.

In most instances, my control circuits are so arranged that the field-discharge resistor 91 is out of circuit when the motor is not in use. In these installations, a spring-closed electromagnetic contactor 94 is included in series with the field-discharge resistor 91, and is normally in its closed, deenergized position. When such contactor 94 is used, either in addition to or in lieu of, the field-switch back-contacts 90B, the contactor 94 is preferably opened during the initial starting period, so as to cooperate with the centrifugal switch 23 to fully sectionalize the field windings 15. The contactor 94 is closed about the same time that the centrifugal switch closes, either slightly before or slightly after, as the case may be.

While I have described a preferred embodiment of my invention, I do not desire to be altogether limited thereto, as such changes may be embodied as do not depart from some or all of the essential principles of my invention, as defined in the appended claims.

I claim as my invention:

1. A rotating-field, polyphase, self-starting synchronous motor comprising an insulated and laminated armature core member having a polyphase armature winding thereon, and a field member having a large number of insulated and laminated field pole pieces mounted on a rim member, said field pole pieces carrying a direct-current field winding and a polyphase, phase-wound, low-reactance, low-resistance damper winding, and means for inserting external resistances in series with the damper winding.

2. A rotating-field, polyphase, self-starting synchronous motor comprising an insulated and laminated armature core member having a polyphase armature winding thereon, and an insulated and laminated-rim field member having a plurality of insulated and laminated field pole pieces thereon, said field pole pieces carrying a direct-current field winding and a polyphase, phase-wound, low-reactance, low-resistance damper winding, and means for inserting external resistances in series with the damper winding.

3. A self-starting synchronous motor comprising an insulated an laminated armature core member having a polyphase armature winding thereon, and an insulated and laminated-rim field member having a plurality of insulated and laminated field pole pieces thereon, said field pole pieces carrying a direct-current field winding and a polyphase, phase-wound, low-reactance, low-resistance damper winding, means for inserting external resistances in series with the damper winding and means for open-circuiting the field winding for the initial starting period.

4. A self-starting synchronous motor characterized by having a damper winding and a direct-current field winding including switching means and a field-discharge resistor, all flux-carrying parts of the field-member iron being insulated and laminated, in combination with means for initially starting on the damper winding alone, the field winding being open-circuited, means operative subsequently for close-circuiting the field winding through its field-discharge resistor, and means operative thereafter for applying the direct-current excitation.

5. A synchronous motor with good starting characteristics, comprising a damper winding and direct-current field winding including switching means and a field-discharge resistor, characterized by all flux-carrying parts of the field-member iron being insulated and laminated, means whereby said motor may be initially started on the damper winding alone, the field winding being open-circuited, substantially no other secondary currents flowing in the machine during said period, means whereby the field winding may be subsequently closed-circuited through its field-discharge resistor, and means whereby the direct-current excitation may be subsequently applied.

6. A rotating-field, polyphase, self-starting synchronous motor comprising an insulated and laminated armature core member having a polyphase armature winding thereon, and an insulated and laminated-rim field member having a plurality of insulated and laminated field pole pieces thereon, said field pole pieces carrying a direct-current field winding and a phase-wound, low-reactance, low-resistance damper winding, means for inserting external resistances in series with the damper winding, and a centrifugal switch for closing a circuit through the field winding only after the motor has accelerated to a predetermined proportion of its synchronous speed.

7. A rotating-field, polyphase, self-starting synchronous motor comprising an insulated and laminated armature core member having a polyphase armature winding thereon and an insulated and laminated-rim field member having a plurality of insulated and laminated field pole pieces thereon, said field pole pieces carrying a direct-current field winding and a phase-wound, low-reactance, low-resistance damper winding, means for inserting external resistances in series with the damper winding, the field winding being divided into a plurality of open-circuited sections during the initial starting period, centrifugally operated switch-contact means for closing its contacts at about 90 percent speed during acceleration and for thereafter keeping its contacts closed during acceleration until about 35 percent speed, and connecting means for operatively joining said centrifugal means to said sections.

8. A self-starting synchronous motor characterized by having a rotating, salient-pole field member having a damper winding and a direct-current field winding open at an intermediate point, and a centrifugal switch for closing said open point at a predetermined speed, all flux-carrying parts of the field-member iron being insulated and laminated, so that the motor initially starts and accelerates to said predetermined speed on the damper winding alone, substantially no other secondary currents flowing in the machine during said period.

9. A salient-pole, rotating-field, synchronous machine characterized by the fact that the rotating field member comprises two spaced spider end plates; each of said end plates being a single plate of metal having holes therein to provide a hub portion, a rim portion and a plurality of connecting spider arms; a plurality of cross rods carried by said rim portions of said spider end plates; an insulated and laminated rim member carried by said rods and supported between said rim portions of said spider end plates; a plurality of insulated and laminated pole pieces mounted on the outer periphery of said rim member; and bolts extending through said rim member from the inner side, for holding said pole pieces in position; the holes in the two spider end plates being staggered, so that all of said bolts are readily accessible from one side or the other.

10. A salient-pole, rotating-field, synchronous machine characterized by the fact that the rotating field member comprises a rim member; two spider end plates supporting said rim member; each of said end plates being a single plate of metal having holes therein to provide a hub portion, a rim portion and a plurality of connecting spider arms; a plurality of pole pieces mounted on the outer periphery of said rim member; and bolts extending through said rim member from the inner side, for holding said pole pieces in position; the holes in the two spider end plates being staggered, so that all of said bolts are readily accessible from one side or the other.

11. A salient-pole, rotating-field, synchronous machine characterized by the fact that the rotating field member comprises a rim member; two spider end plates supporting said rim member; a hub member disposed against the outside of each of said end plates; a plurality of spacing means between said end plates in the vicinity of said hub members, and means for securing said hub members to said end plates.

12. A salient-pole, rotating-field, synchronous machine characterized by the fact that the rotating field member comprises a rim member; two spider end plates supporting said rim member; a hub member disposed against the outside of each of said end plates; a plurality of shouldered pins between said end plates in the vicinity of said hub members, and having extensions entering into the two hub members.

13. A rotating-field, polyphase, self-starting synchronous motor characterized by having a combined damper and starting winding and a direct-current field winding on the rotor, the field winding being divided into a plurality of open-circuited sections during the initial starting period, a centrifugally operated switch-contact means for closing its contacts at about 90 percent speed, during acceleration and for thereafter keeping its contacts closed during deceleration until about 35 percent speed, and connecting means for operatively joining said centrifugal means to said sections.

14. A salient-pole, rotating-field, polyphase, self-starting synchronous motor characterized by having a combined damper and starting winding and a direct-current field winding on the rotor, and a centrifugal switch for open-circuiting and close-circuiting said field winding in response to the speed, said switch being of a type which closes quickly at some speed between 50 and 98 percent speed and opens quickly at some speed between zero and 40 percent speed.

15. A synchronous motor characterized by a field member comprising salient pole pieces having six slots in each pole face, and a one-conductor-per-slot, phase-wound, three-phase damper winding in said slots; one phase comprising all of the conductors in slot 2 of each pole, joined together, in series with all of the conductors in slot 3 of each pole, joined together, the winding progressing in one direction around the periphery; a second phase comprising similarly the conductors in slots 4 and 5 with the winding progressing in the opposite direction around the periphery; and the remaining phase comprising the conductors in slot 6 of each pole, joined together and progressing in the first-named direction around the periphery, in series with the conductors in slot 1 of each pole, joined together and progressing in the opposite direction around the periphery.

16. An alternating-current dynamo-electric machine comprising a slotted core member having six peripheral slots per pole, and a one-conductor-per-slot, phase-wound, three-phase winding in said slots; one phase comprising all of the conductors in slot 2 of each pole, joined together, in series with all of the conductors in slot 3 of each pole, joined together, the winding progressing in one direction around the periphery; a second phase comprising similarly the conductors in slots 4 and 5 with the winding progressing in the opposite direction around the periphery; and the remaining phase comprising the conductors in slot 6 of each pole, joined together and progressing in the first-named direction around the periphery, in series with the conductors in slot 1 of each pole, joined together and progressing in the opposite direction around the periphery.

17. A synchronous motor characterized by a field member comprising salient pole pieces having a plurality of perforations arranged therein near the air-gap of the motor, a one-conductor-per-slot, phase-wound, polyphase, temporary-duty starting winding in said slots, the conductor bars of said winding being in J-shaped pieces comprising a straight portion lying in the slots and an end connection at one end.

18. A synchronous motor characterized by a field member comprising salient pole pieces having a plurality of perforations arranged therein near the air-gap of the motor, a one-conductor-per-slot, phase-wound, polyphase, temporary-duty starting winding in said slots, the conductor bars of said winding being in J-shaped pieces comprising a straight portion lying in the slots and an end connection at one end, said end connection comprising two inclined portions joined by a longitudinally offset connection in substantially the center thereof.

19. An alternating-current dynamo-electric machine comprising a slotted core member having peripheral slots, a one-conductor-ber-slot phase-wound, polyphase secondary winding in said slots, the conductor bars of said winding being in J-shaped pieces comprising a straight portion lying in the slots and an end connection at one end, said end connection comprising two inclined portions joined by a longitudinally offset connection in substantially the center thereof.

20. A synchronous motor with good starting characteristics, comprising a salient-pole field member, a direct-current field winding on said field member, a low-reactance, polyphase, phase-wound damper winding on said field member, and a variable external polyphase resistor for said damper winding, further characterized by means whereby said motor may be initially started on the damper winding alone, the field winding being open-circuited, varying means whereby said external damper-winding resistor may be varied to decrease its resistance, and means whereby the direct-current excitation may be subsequently applied.

21. A synchronous motor with good starting characteristics, comprising a salient-pole field member, a direct-current field winding on said field member, a low-reactance, polyphase, phase-wound damper winding on said field member, a variable external polyphase resistor for said damper winding, and a field-resistor, further characterized by means whereby said motor may be initially started on the damper winding alone, the field winding being open-circuited, means whereby external damper-winding resistor may be varied to decrease its resistance, means whereby the field winding may be subsequently closed-circuited through its field-resistor, and means whereby the direct-current excitation may be subsequently applied.

In testimony whereof, I have hereunto subscribed my name this 6th day of August, 1929.

HENRY V. PUTMAN.